United States Patent
Wertheimer et al.

(10) Patent No.: US 7,881,952 B2
(45) Date of Patent: *Feb. 1, 2011

(54) COMPETITIVE AVAILABILITY TOOLS

(75) Inventors: Jeremy Wertheimer, Brookline, MA (US); Carl G. DeMareken, Arlington, MA (US)

(73) Assignee: ITA Software, Inc., Cambridge, MA (US)

( * ) Notice: Subject to any disclaimer, the term of this patent is extended or adjusted under 35 U.S.C. 154(b) by 569 days.

This patent is subject to a terminal disclaimer.

(21) Appl. No.: 11/745,552

(22) Filed: May 8, 2007

(65) Prior Publication Data

US 2008/0281643 A1 Nov. 13, 2008

Related U.S. Application Data

(63) Continuation of application No. 09/615,574, filed on Jul. 13, 2000, now Pat. No. 7,216,085.

(51) Int. Cl.
*G06F 17/50* (2006.01)
*G06Q 10/00* (2006.01)

(52) U.S. Cl. ........................................................ 705/5

(58) Field of Classification Search .................... 705/1, 705/5, 400
See application file for complete search history.

(56) References Cited

U.S. PATENT DOCUMENTS

| | | | | |
|---|---|---|---|---|
| 3,622,995 A * | 11/1971 | Dilks et al. | ................ | 235/382 |
| 5,652,867 A * | 7/1997 | Barlow et al. | ................ | 703/6 |
| 6,112,185 A * | 8/2000 | Walker et al. | ................ | 705/5 |
| 6,721,714 B1 * | 4/2004 | Baiada et al. | ................ | 705/7 |
| 6,974,079 B1 * | 12/2005 | Strothmann et al. | ......... | 235/384 |
| 7,487,103 B2 * | 2/2009 | Feyder | ........................ | 705/5 |
| 2005/0228702 A1 * | 10/2005 | Fairbanks et al. | ............. | 705/5 |
| 2006/0200370 A1 * | 9/2006 | Ratliff et al. | ................... | 705/5 |

OTHER PUBLICATIONS

"Hub-dominated airports: an empirical assessment of challenger strategies." Kling et al, Logistics and Transportation Review, v27, n3, p. 203, Sep. 1991.*

* cited by examiner

*Primary Examiner*—Rutao Wu
(74) *Attorney, Agent, or Firm*—Fish & Richardson P.C.

(57) ABSTRACT

A competitive, availability prediction system for predicting relative, competitive availability of seating on an airline flight is described. The system includes an availability predictor that predicts seating availability on a competitive flight, an availability system that produces an actual availability response for a flight and decision logic that compares the predicted answer from the availability predictor and the potential answer from the availability system to establish a decision with respect to actual availability.

30 Claims, 10 Drawing Sheets

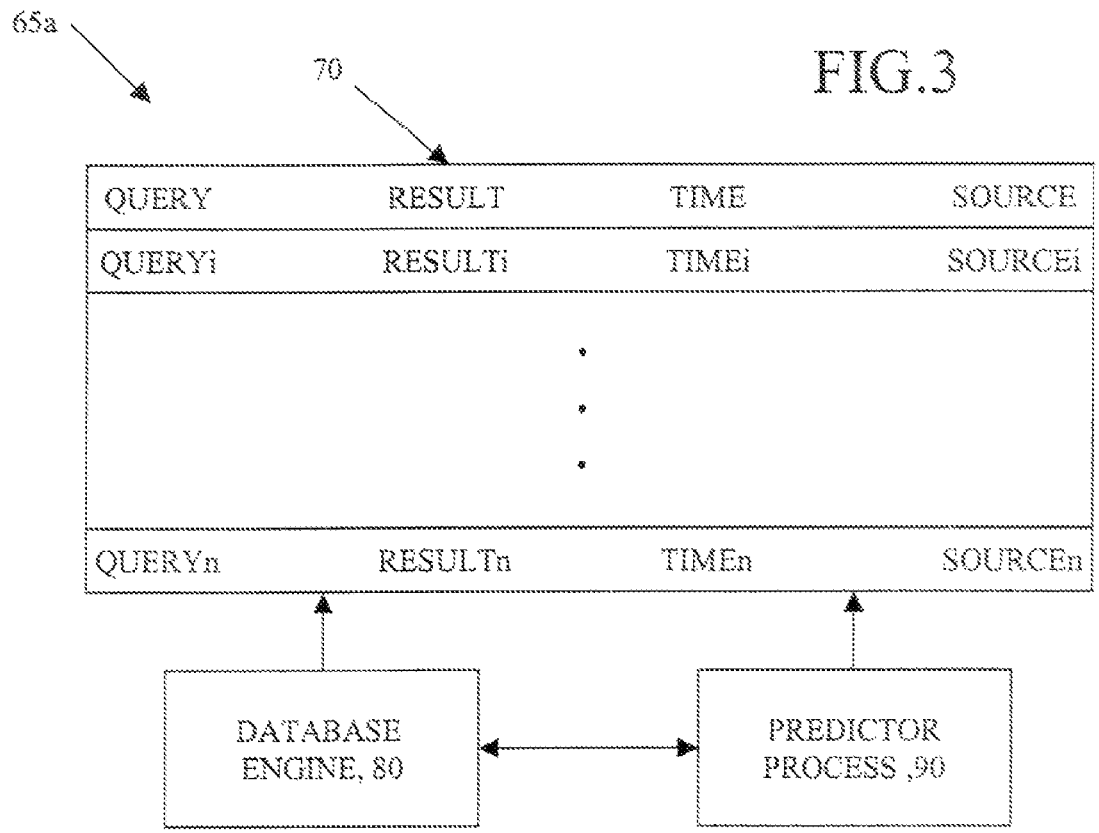
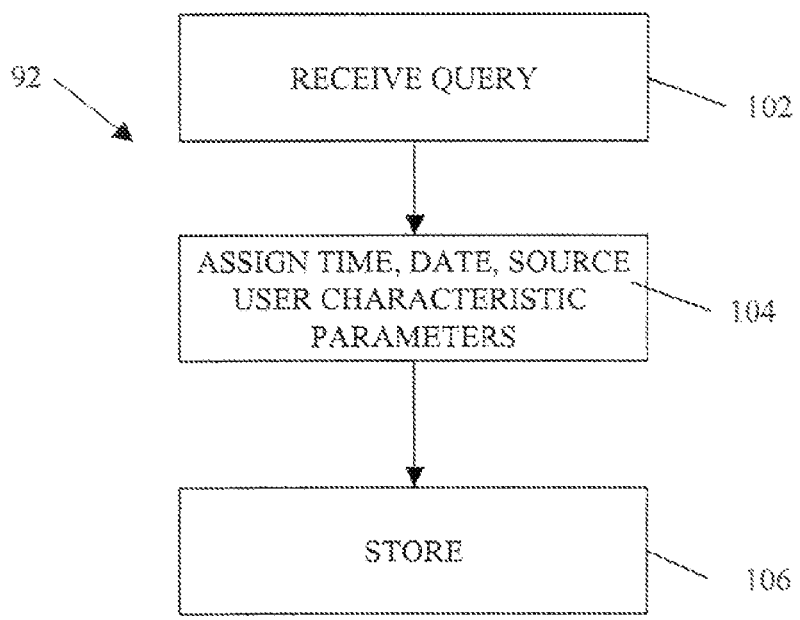

COMPETITIVE AVAILABILITY TOOLS

This application is a continuation application and claims priority under 35 U.S.C. §120 to U.S. patent application Ser. No. 09/615,574. Filed on Jul. 13, 2000, now U.S. Pat. No. 7,216,085, issued on May 8, 2007.

BACKGROUND

This invention relates generally to determining airline seat availability information for use in travel planning and travel reservation systems.

Airlines institute selling policies that can change to meet supply and demand considerations to maximize profit on any given flight. When a passenger specifies an itinerary the itinerary has one or more flight segments. In order to issue a ticket for a single or multi-flight segment itinerary, each flight segment must be available. That is, each flight segment must have seats that have not been already reserved for other passengers. Availability can also be govern by whether an airline will sell to a particular passenger given characteristics of the passenger. Common characteristics which are used by airlines to decide whether or not to sell a ticket is the price that the passenger is willing to pay for the ticket, whether the passenger is using other flights on that airline, whether the passenger is a frequent flyer and so forth.

Generally, before booking a flight and issuing a ticket, the seller can send a request for availability information to the airline. In general, a request for availability is sent over a computer network to an airline and is processed in the airline's computer system. An answer to the request is provided from the system. Commonly, a message is returned to the seller. The message includes one or possibly a plurality of so-called booking codes that are labels used to designate different prices that an airline is willing to sell tickets at. Associated with these booking codes or labels are often a number of seats that the airline is willing to sell in each booking code. For example, a common booking code is the "Y" booking code and the message may contain Y/25 meaning the Y booking code has 25 seats. A second booking code may be the "Q" booking code and may contain a message which says Q/0 meaning that the Q booking code has 0 seats available. Although the exact meaning of booking codes may vary from carrier to carrier, in general most carriers will use Y booking codes corresponding to an expensive coach class fare and a Q booking code as an inexpensive coach class fare. The airline would make the seat at the Y booking code available, i.e., a higher profit booking code, rather than make the seat available at the Q booking code, i.e., a lower profit fare.

SUMMARY

According to an aspect of the invention, a competitive, availability prediction system for predicting relative, competitive availability of seating on an airline flight includes an availability predictor that predicts seating availability on a competitive flight, an availability system that produces an actual availability response for a flight and decision logic that compares the predicted answer from the availability predictor and the potential answer from the availability system to establish a decision with respect to actual availability.

According to an additional aspect of the present invention, a method of predicting relative, competitive availability of seating on an airline flight includes predicting seating availability on a competitive flight and providing an actual availability response for a flight. The method also includes comparing the predicted answer from the availability predictor and the potential answer from the availability system to establish a decision with respect to actual availability.

BRIEF DESCRIPTION OF THE DRAWINGS

FIG. 3 is a block diagram of an availability database.

FIGS. 5 and 6 are flow charts or processes used with the availability database.

DETAILED DESCRIPTION

Figure 1:
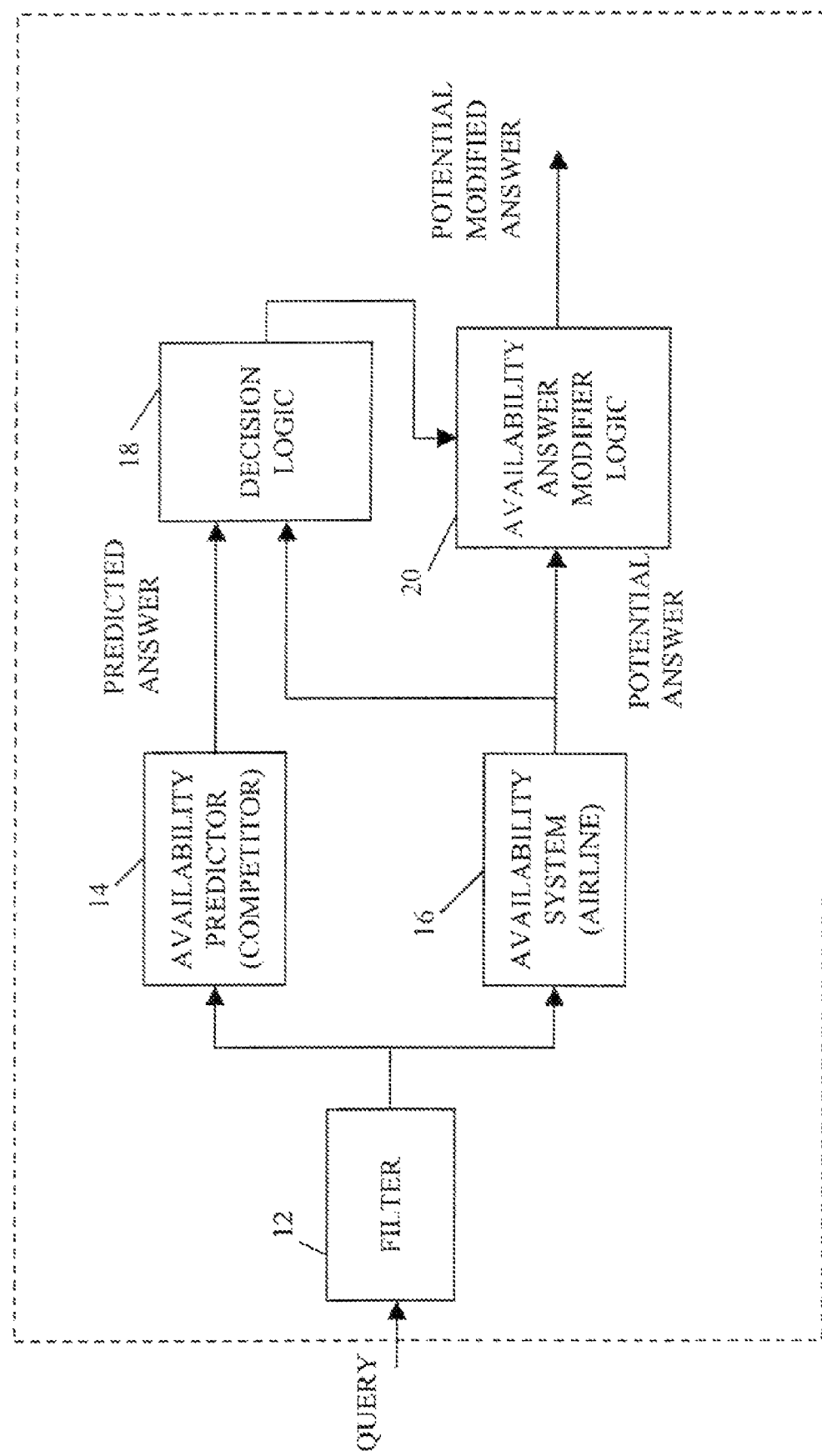
FIG. 1 is a block diagram of a competitive airline availability system.

Referring now to FIG. 1, a competitive availability system 10 is shown. The competitive availability system includes a filter 12 that is used to filter queries received by the system 10. The filter 12 can have rules that allow the filter 12 to pass through those queries that correspond to flights supported by a user of the competitive availability system 10, as well as selected competitors of that user. Other criteria can also be used in the filter 12. The competitive availability system 10 produces a prediction of the availability of a seat on a competitor's flight or flights and how a competitor or competitors may respond to an availability request. The user of the competitive availability system 10 can decide whether and how to adjust its response from the availability system 74.

In the typical case, the user of the competitive availability system 10 would be an airline that desires to modify its actual availability response to an availability query that it receives based on how it expects a competitor airlines might respond to the same query.

The filtered queries provided from filter 12 are fed to one or more availability predictors generally denoted as 14. The availability predictors 14 are provided for each competitor for which the user of the competitive availability system 10 desires so compare airline availability responses. Preferred techniques for implementing the availability predictor 14 are described in conjunction with FIGS. 3-11 below.

The filtered queries are also fed so the actual or a simulated availability system 16 of the airline that owns or uses the competitive availability system 10. The availability predictor 14 and the availability system 16 each produces answers. The availability predictor produces a predicted answer for the competitor and the availability system produces a potential availability answer for the user of the competitive availability system 10. These answers are fed to decision logic 18. The decision logic 18 compares the answers to determine whether or not the actual answer that will be provided from the user's availability system 16 should be modified to take into consideration the relative competitive situation of the competitor represented by the availability predictor 14. The decision logic 18 produces an output chat corresponds to a message that is sent to the availability answer modifier logic 20. The message from the decision logic can take on a number of forms and have a number of states. One exemplary message form can be one that biases the modifier logic 20 in one direction or another. Such a message form can have several states. One state could be a neutral state with respect to biasing an availability answer provided from the availability system. That is, a neutral answer can be returned and would not tend to modify the potential answer received from the availability system 16. A second state could bias towards answering that a seat is available. A third state could towards answering that a seat is not available. The state would depend upon the relative competitive position of the competitor represented by the availability predictor 14.

The availability answer modifier logic 20 receives the potential availability answer provided from the availability system 15 and the message from the decision logic 18 and selectively modifies the potential availability answer received from the availability system 16 in accordance with the bias of state of the message from the decision logic 18. The potential, modified availability answer is the answer that is sent to the entity that initiated the query to the airline's availability system 16.

Figure 2A:
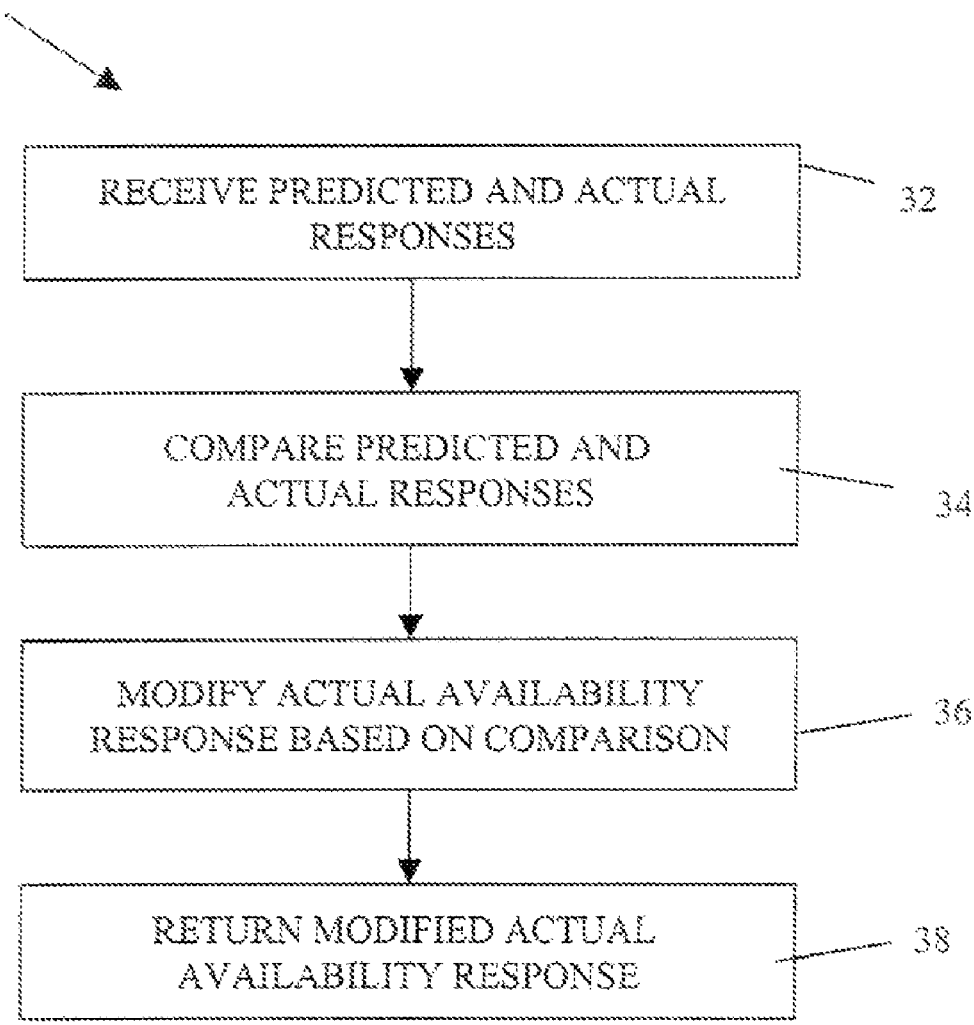
FIG. 2A is a flow chart of a process used in the competitive airline availability system of FIG. 3.

Referring now to FIG. 2A, a process 30 incorporating high level decision logic 18' and modification logic 20, that is used in the system of FIG. 1 is shown. The process 30 receives 32 the predicted and potential, actual responses from the availability predictor 14 (FIG. 3; and the availability system 10 (FIG. 3) and compares 34 the predicted and potential, actual responses to arrive at a decision of whether to bias a modification towards making a seat more available, less available or to remain neutral. The process 30 will modify 36 the potential, actual availability response based upon the comparison and may return 38 the potential, actual availability response or a modified actual availability response to the entity that issued the query in the first instance.

Figure 2B:
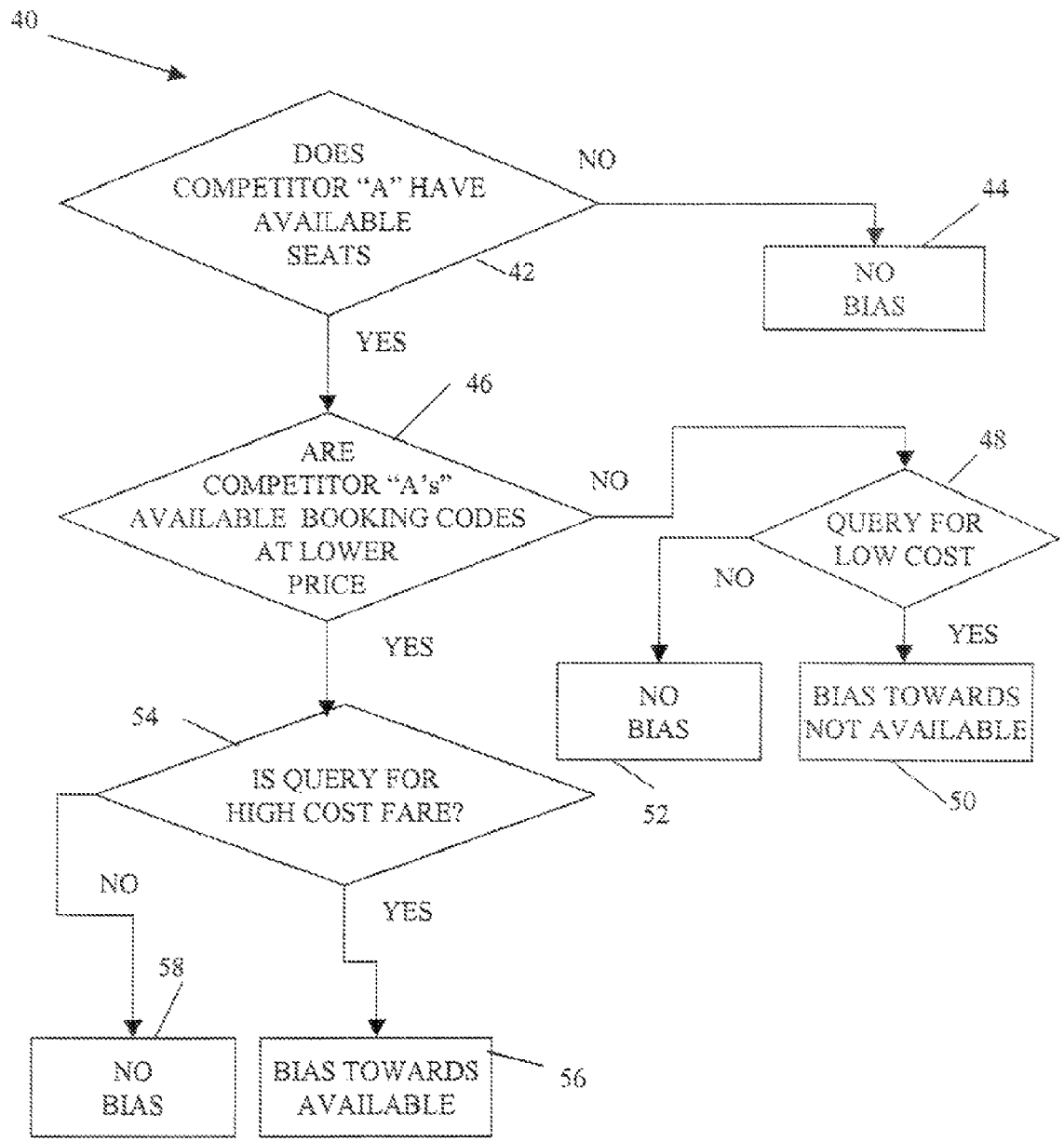
FIG. 2B is a flow chart of exemplary decision logic used in the competitive availability system of FIG. 3.

Referring now to FIG. 2B, an exemplary process flow 40 for decision logic 18 (FIG. 15 is shown. It should be understood, however, this is merely an exemplary process flow and many other process flows may alternatively be used. The process flow 40 examines the competitor's relative position to the user of the availability system 10. In particular, the process will ask 42 whether the availability predictor 14 predicts that the competitor has available seats. If the prediction is that the competitor does not have available seats, then the decision logic could return 44 a message indicating "no bias" i.e., the modification logic would not change the potential answer issued by the availability system 16. If the competitor does have available seats, the decision logic 18 can determine 46 whether the competitor's available booking codes are at a lower price than those which the availability system 14 indicates the user of the system 10 can offer. If the competitor's available booking codes are not at a lower price, then the system can test 48 whether the original query was for a "low cost fare." If the query was for a "low cost fare," the system can return 50 a bias towards making the seat "not available." Otherwise, the system can return 52 "no bias."

If the competitor's available booking codes are at a lower price than those being offered by the user of the system 10, the system can ask whether 54 the query was for a "high cost fare." If the query was for a "high cost fare," the decision logic 18 can return 56 a bias towards making the seat "available." If it was not for a high cost fare, the system can return a message of "no bias" 118.

Alternatively, the messages that are returned could be change the availability message from the availability system 16, rather than merely biasing a change in the availability message.

The modification logic 20 can change the actual availability answer from the availability system 16 using various analytical techniques. For example, the messages can have a bias that is set as a threshold value and the modification logic can examine the messages to determine if the threshold value calculated in the decision logic 18 exceeds the threshold set in the modification logic 20. The threshold can be set taking into considerations factors such as current inventory for a flight, days to departure, booking code availability and so forth.

It should be understood that many other considerations can enter into the decision logic 18 to determine whether or not an availability answer should be modified based upon a competitor's relative competitive position. Moreover, although only a single availability predictor 14 for a single competitor is shown in FIG. 1 and described in FIGS. 2A and 2B, it should be apparent that many more availability predictors 14 can be provided, one for each competitor of the user of the system 10. The decision logic 18 and the process flow would be substantially similar except for modifications needed to compare the relative competitive positions of the additional competitors.

Referring now to FIG. 3, a first embodiment 65a of an availability predictor 65 includes a database 70, a database engine 80 and a predictor process 90. The database 70 stores availability queries and answers, as shown. Several sources of availability information can be used. One type of source is actual availability answers. However, certain considerations can make these types unattractive or not available. Other sources therefore could include public sources of seat availability such as ticket information, passenger lists, etc. Also AVS messages as described below could be used. The queries and the results of these queries can be forwarded and stored in the database 70. The database 70 will contain the query such as shown below. For a query involving a single flight:

| Airl | Flt# | Orig | Dest | Date | TripOrigin | TripDest | SoldIn | SoldBy |
|------|------|------|------|------|------------|----------|--------|--------|
| AA | 1822 | BOS | DEN | 25MAR99 | BOS | LAX | US | Amer. Expr. | or for a query involving multiple flights:

| Airl | Flt | Orig | Dest | Date | TripOrigin | TripDest | SoldIn | SoldBy |
|------|-----|------|------|------|------------|----------|--------|--------|
| AA | 1822 | BOS | DEN | 25MAR99 | BOS | LAX | US | Amer. Expr. |
| AA | 0421 | DEN | LAX | 25MAR99 | BOS | LAX | US | Amer. Expr. |

A result will generally comprise a message such as shown below:

| Airl | Flt# | Orig | Dest | Date | BookingCodes&Counts |
|------|------|------|------|---------|---------------------|
| AA or | 1822 | BOS | DEN | 25MAR99 | F0 C0 Y9 M5 K5 L0 Q0 |
| AA | 1822 | BOS | DEN | 25MAR99 | F0 C0 Y9 M5 K5 L0 Q0 |
| AA | 0421 | DEN | LAX | 25MAR99 | F1 C0 Y4 M5 K1 L1 Q1 |

Additional information can be stored in the database 70 which may typically be generated by the availability predictor 65a. For example, the query can be stored along with an entry that corresponds to the time and/or date that the query was stored, received, and/or generated. The source of the query can also be noted. In addition, other information may also be stored with the query such as characteristics of the customer or traveler. Such characteristics may include the traveler's nationality, point of purchase or status such as whether the traveler is a frequent flyer or whether the traveler is booking other flights on the airline to which the query was directed and so forth. The database 70 can also be populated by routine direct queries from the various sources even in the essence of queries made to the predictor so that, when a question is asked of the predictor, it is less likely that a direct query would have to be made. For example, the database 70 may be populated during off peak times for travel agents or may be simply populated with such routine queries when the system is not otherwise in use.

The database engine 80 populates the database 70. The engine 80 can produce queries of certain types depending upon the relative factors involved in any particular flight and/or airline. Such routine queries could be automatically produced by the database engine 80 for those markets and/or flights in which air travel is particularly heavy or during such periods of time where air travel between particular origins and destinations would be particularly heavy.

Figure 4:
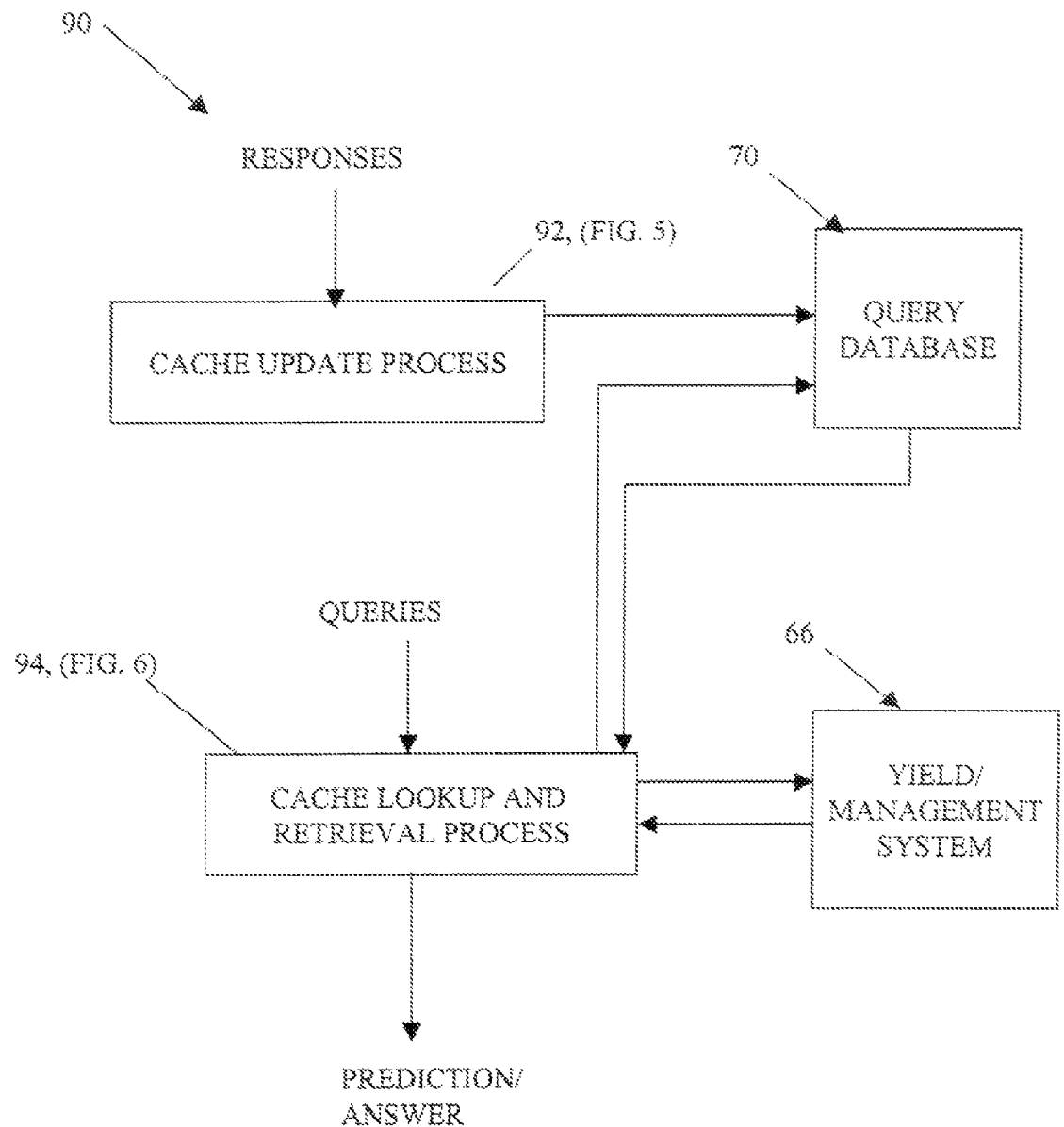
FIG. 4 is a block diagram of a predictor using the availability database of FIG. 4.

Referring now to FIG. 4, the predictor process 90 that uses the database 70 to provide predicted availability answers is shown. The predictor process 90 includes an update process 92 that interfaces with the query database 70 (FIG. 3) and database engine 80 to make sure that the query database 70 contains the most current information available for the availability predictor 90. The update process 92 takes responses that are received from queries made by various sources, and populates them into the query database 70 as appropriate. The predictor 90 also includes a look-up and retrieval process 94 that interfaces with the query database 70, as well as other sources of availability data. In response to a query, the look-up and retrieval process 94 produces either a prediction for the answer of true query or an actual answer depending upon whether the look-up and retrieval process retrieves an answer from the database 70 or other sources.

Referring now to FIG. 5, the update process 92 receives a query 102 from either the availability predictor 90 or from other sources, as described in conjunction with FIG. 3. The update process 92 assigns 104 a time, date, source, and user characteristic parameters, if available, as appropriate and stores 106 the query along with the answer and the assigned parameters in the query database 70.

Figure 6:
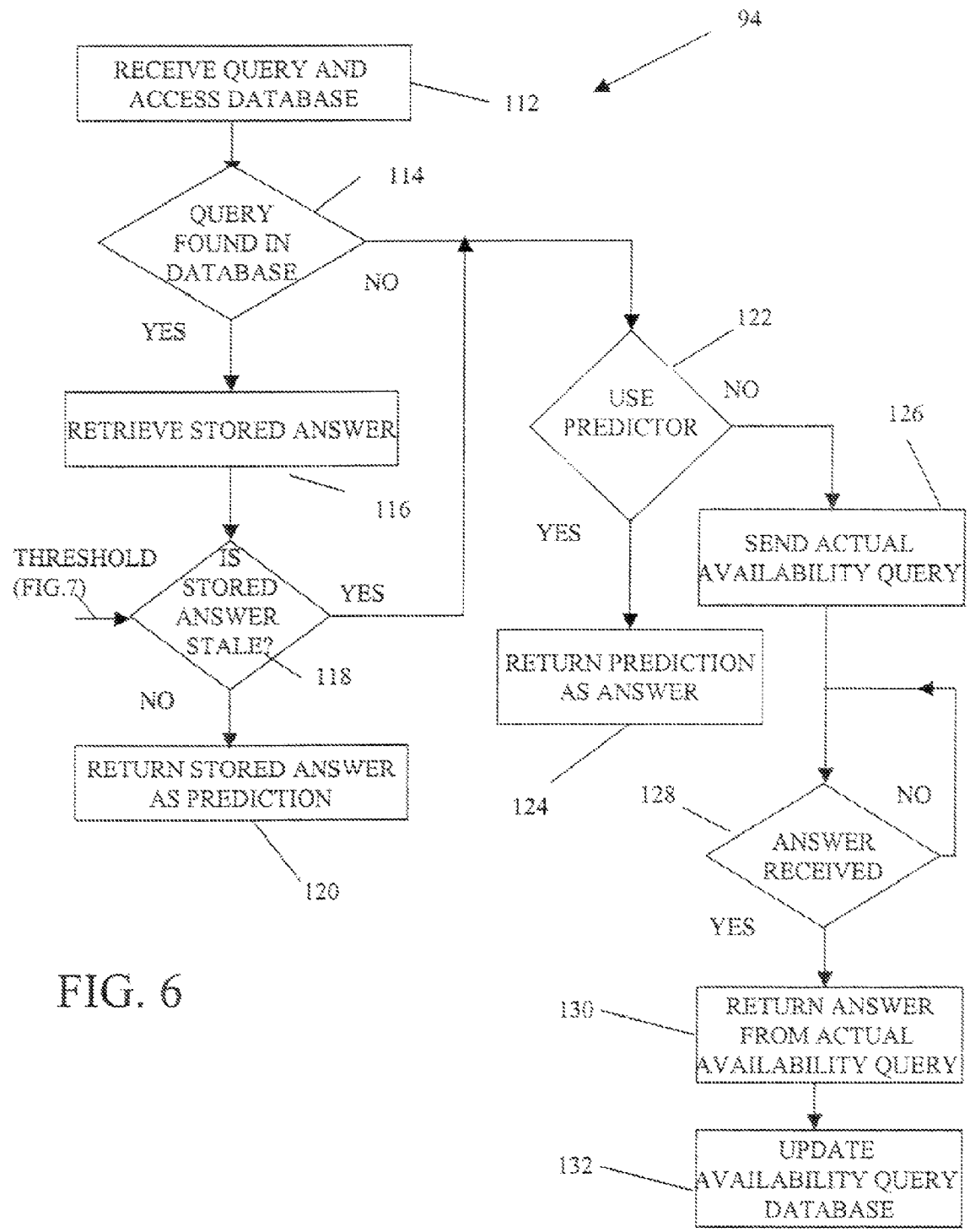

Referring now to FIG. 6, the look-up and retrieval process 94 receives a query. Queries can include information such as airline, flight number or numbers, origin and destination airports, and travel date. In addition, the information can also include trip origin and destination if different than the origin and destination of the queried flight-segments. Queries may also include information about the selling location or agency. For travel involving multiple flight-segments, individual queries may be constructed for each flight segment, or a single query for multiple flight-segments might be constructed.

Figure 7:
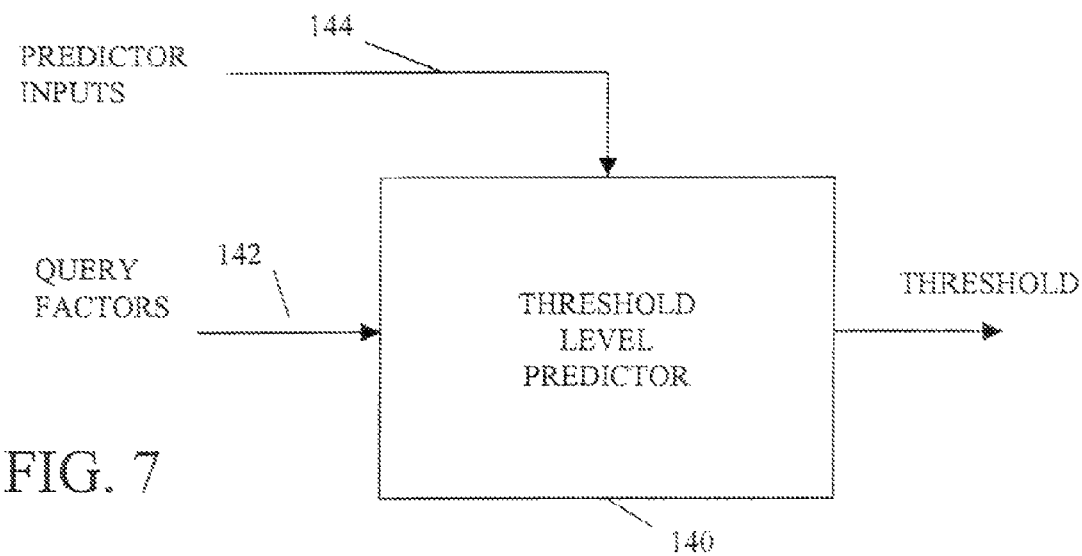
FIG. 7 is a block diagram of a threshold level predictor.

The look-up and retrieval process 94 will look up 112 the received query in the query database 70 by attempting to match the query fields such as airline, flight number/numbers, date, trip origin and destination, sale location and agency. If a stored query is found 114 in the query database 70 that matches the received query or which is substantially close in characteristics to the received query, the process 94 will retrieve 116 the stored answer. The process 94 will determine if the stored answer is stale 118 by comparing the time of the query to a threshold time that can be either a preset threshold such as a certain number of minutes, hours or days or preferably a variable threshold that is determined in accordance with a threshold level predictor 120 (FIG. 7). If the answer is not stale, then the look-up and retrieval process 94 will return 120 the stored answer as a prediction of the availability of a seat on a particular flight according to the availability query.

If the query was not found in the database 70 or if the stored query which was found is stale, the look-up and retrieval process 94 optionally can determine 122 whether or not to use another predictor such as one of the predictors to be described in conjunction with FIGS. 8-11. If the look-up and retrieval process 94 has this option, the process 94 will return 124 the prediction from those predictors, as the prediction from the availability predictor 65a. Otherwise, it the look-up and retrieval process 94 does not have a predictor or does not trust the predictor, then the process can send 126 an actual availability query to the and availability system 66 (FIG. 2) or other sources. The answer that is received 128 from the availability system 66 or other sources is returned 130 as the answer and can be used to update 130 the database 70. The database 70 can be implemented using various approaches including hierarchical, relational or object oriented databases, or alternatively, a software or hardware cache. In addition, the answer can include a confidence factor based on whether the query is stale or whether an actual query was performed.

Referring now to FIG. 7, a threshold level predictor 140 is shown. The threshold level predictor 140 can be fed by query factors 142 such as the date of a flight, origin and destination of the flight, size of the airplane and so forth and also fed by predictor inputs 144 that determine relative weights, for example, to assign to each one of the query factors. The threshold level predictor 140 can determine a threshold time interval that can change over time. The threshold level predictor 140 can be used by the look-up and retrieval process 94 to determine whether a stored query is stale. The threshold level predictor 140 can be a mechanism that models or predicts a rats at which seats are reserved on a particular airline given the inputs or the time that an airline adjusts parameters that affect how availability seats are distributed among various booking codes. The model can take into consideration historical rates at which flights or families of flights are sold on different dates, aircraft capacity, external events such as strikes or sales and so forth.

Figure 8:
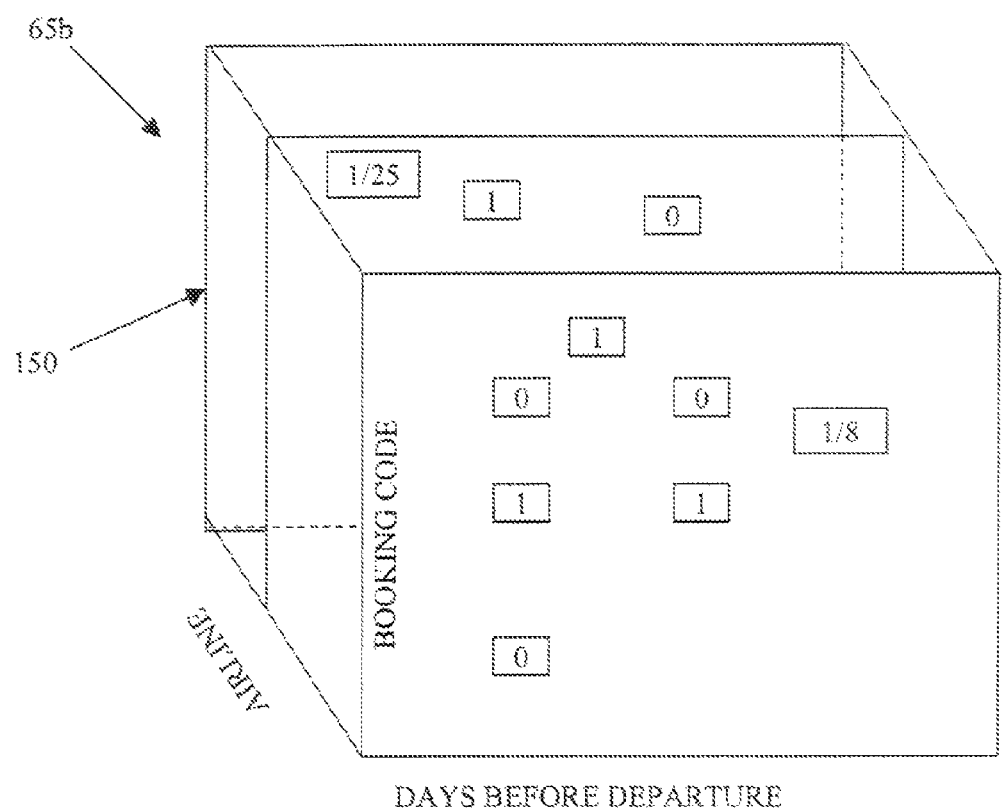
FIG. 8 is a block diagram of an availability cable.

For a very simple example, the threshold predictor 140 could be a table similar to FIG. 8 that includes for every airline/booking-code/days-before-departure entry, a number of hours after which a database answer will be considered stale. This table could be trained on historical data by recording for each airline/booking-code/days-before-departure combination the average maximum number of hours prior to a query that other queries returned the same answer. For example, if in the past on American 3 days before departure in booking code Q, query answers remained the same for an average of 8 hours, then 8 hours would be stored in the table, and database queries for AA/Q/3-days-before-departure would be considered stale if they were more than 8 hours old.

Several options are provided for returning the predictions and/or answers from the look-up and retrieval process 94. For example, the look-up retrieval process 91 can simply return a true/false indication indicating that a seat conforming to the parameters of the query is available or is not available. Alternatively, the look-up and retrieval process 94 can return a probability estimate of availability of a seat conforming to the parameters of the query. In addition, the predictions can return a true/false indication or a probability on a booking code basis.

In addition to being populated with direct queries made by the availability predictor or queries that are obtained from other sources, additional types of query messages can also be used to populate the query database 70. For example, in many countries it is common for airlines to send out so-called "AVS" (available seat) messages which are distributed from certain airlines, particularly in foreign countries, to other airlines or computer reservation systems. AVS messages specify for a given flight segment whether there are seats remaining on that flight. Sometimes those messages can specify seating on a per booking code basis. Mot all airlines use the AVS message process and, therefore, its use in the database would be limited to the availability of such messages for any particular flight segment and airline. Nevertheless, this could be an additional mechanism used to improve the data that is stored in the query database.

Referring now to FIG. 8, a table predictor 65*c* is shown. The table predictor 65*c* can be in the form of a three-dimensional table that is stored in computer memory. This is only an example. The table does not have to be three dimensional, and the axes could be different features of an availability query. The table can be indexed by any number of the features of the query. In this example, the table can correspond to the following: the X axis can be a time axis specifying days or hours before departure, the Y axis can be airlines and the Z axis can be booking codes.

The table 150 could have 0's or 1's entries 152 corresponding to not available/available. Alternatively, these entries 152 could also be probability estimates (not shown). This table 150 could be populated by historical information about how often booking codes were available in the past for the airline/booking-code/days-before-departure. For example, if over the past few months availability queries for AA flight 66 that were sent 3 days in advance of travel had booking code Q available 80% of the time, then the probability 0.8 could be stored in the table. When using the predictor 65*b*, 0.8 could be returned for AA/3 day/Q queries, or if an available/not-available answer was desired, "available" could be answered because 0.8>0.5. In addition, the table could also be populated with the number of seats 154 that might be available on a booking code basis. This can be determined from historical information. The table predictor may also store a number that corresponds to the number of actual queries that were used to arrive at the probability estimate. This number can be used to produce a confidence factor that is returned with the predictor.

Figure 9:
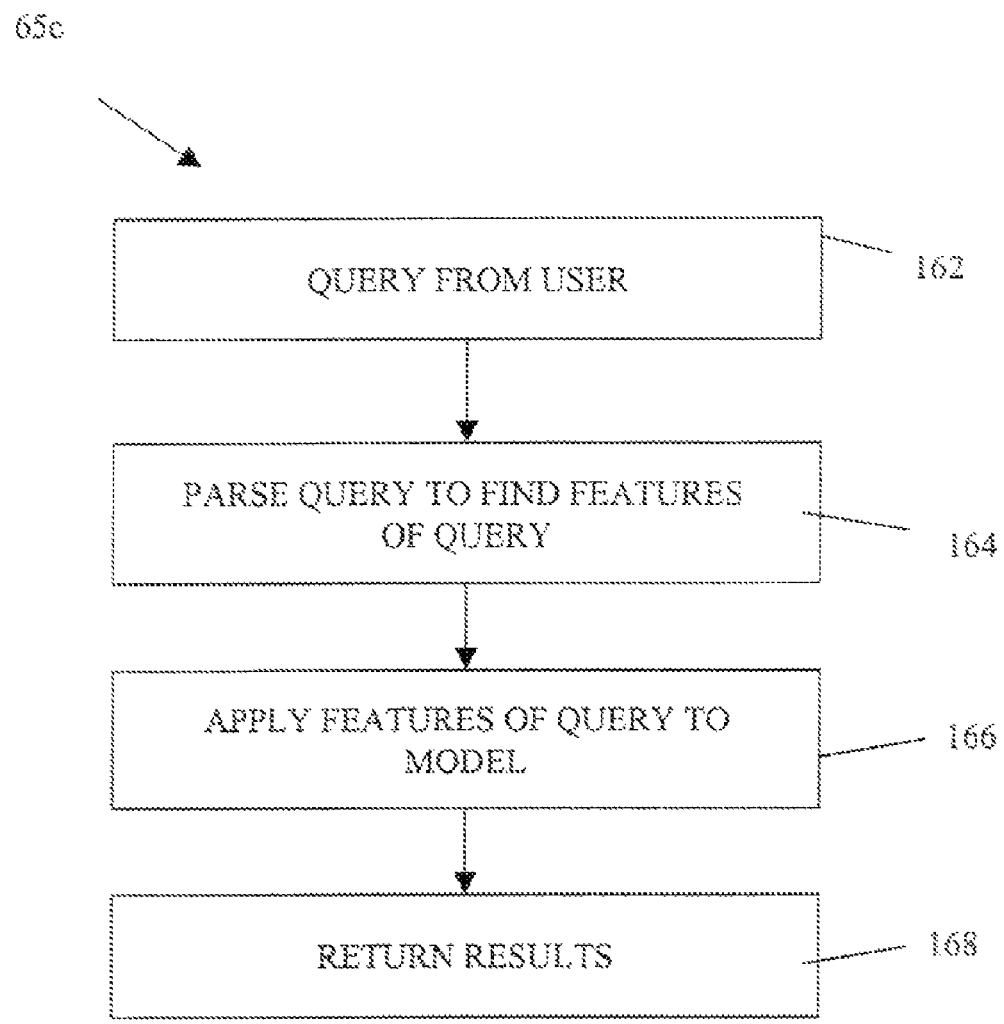
FIG. 9 is a block diagram of an availability predictor.
Figure 9A:
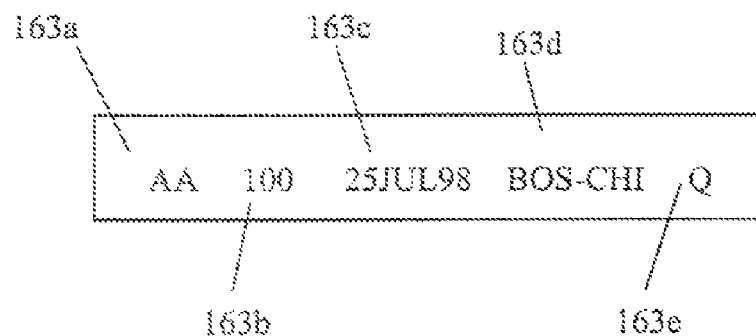
FIG. 9A is a diagram showing an exemplary query.

Referring now to FIG. 9, a model-based predictor embodiment 65*c* of the availability predictor 65 is shown. The model-based availability predictor 65*c* receives 122 a query from a user. The query 163, as shown in FIG. 9A, includes information including an airline 163*a*, a flight number 163*b*, a date 163*c*, an origin and destination (or city pair) 163*d*, as well as, one or more booking codes 163*e*. In addition, the query 163 may include other information including point of sale, sales agent, possibly multiple flight numbers, possibly a trip origin and trip destination (as opposed to just the origin/destination of the flights being queried). The query 163 is parsed and analyzed 164 by the model-based availability predictor 65*c* to find features or characteristics of the query 163. That is, the query 163 is broken down to features such as flight number type, period of flight, origin and destination types, the length of time before the flight departs, travel times in the query, and so forth. In addition, the aircraft and capacity, as well as, external events such as sales and strikes, historical availability, and traffic on other flights properties of the traveler and so forth.

For a sample query 163 "UA 100 25JUL98 BOS-CHI Q", the availability predictor can parse 164 that into the following information; the query 163 is for a United Airlines flight, a major carrier, having a flight number 100, a "low number flight", that the date of the flight is in "the summer", and that the flight is between "two major" cities. The query can determine that the requested fare is a "low cost" fare for Q booking code. In addition, although not present in this query, other factors could also be present in a typical availability query. For example, if the booking code was Y that would indicate a high cost fare. If the flight number is 7500, that could indicate a high flight number and if the origin and destination were "DLH-HIB" (Duluth to Hibbing), that could indicate a flight between two small cities.

Among the features that the availability predictor 65*c* may take into account are entries in a database of recent or historical fares such as database 70 (FIG. 3). Two features of a query may be "is there a query in the database 70 (FIG. 3) for a similar flight on the same day where the booking code is available" or "is there a query in the database for the same flight on the same day where the booking code is available." The answers in the database 70 (FIG. 3) may be too old to return as an answer, but the information may still be useful in the statistical predictor 65*c*. This is noted in FIGS. 6 and 10 by the paths between the database and the predictor.

The availability predictor 65*c* applies 166 the positive, that is, present features of the query to a model and the model returns 168 a prediction of availability corresponding to the query. The results that could be returned from the query may be, for example, a simple "yes", "no", i.e, 1,0 binary return, which indicates either a seat is available or not available or, alternatively, the model may return a number which is or can represent a probability that a seat is available or not available.

Figure 10A:
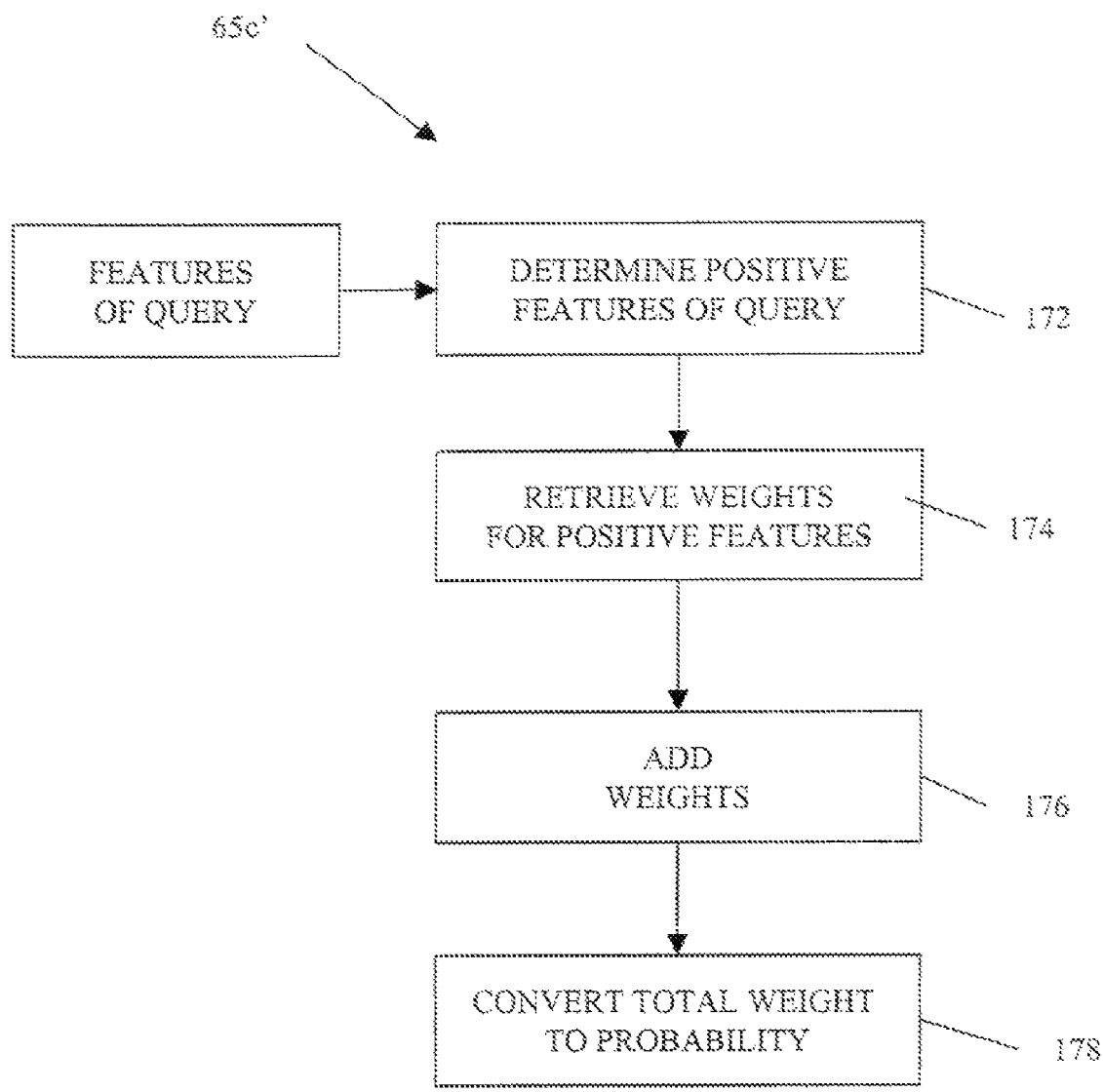
FIG. 10A is a block diagram of an availability predictor of FIG. 3 using an exponential modeling algorithm.

Referring now to FIG. 10A, one embodiment 65*c'* of the model-based availability predictor 65*c* is shown. The predictor 65*c'* determines 172 positive features of the query. The predictor 65*c'* retrieves 174 weights for the positive features with the weights either set in accordance with expert understanding of airline's availability, or, automatically from historical data. In this case, algorithms for setting the weights can be found in various statistics and "machine learning" textbooks such as "Neural Networks for Pattern Recognition" by Christopher Bishop, Oxford Press.

One such algorithm is called "gradient descent" and is approximately as follows:

1. For each feature F, set its weight W(F) to 1.
2. Calculate for each feature F the number of historical queries that returned "available" that the feature occurred in, and call it H(F). (For example, if an American Airlines feature (AA) occurred in 200 queries that were available, then let H(AA)=200).
3. using the current weights, calculate for each historical query R the probability P(H) of it being available, using the same equations used for normally predicting availability: $P(H)=\exp(X)/(1+\exp(X))$ where $X=\text{sum } W(F)$ for all features F in H.
4. For each feature F, calculate the number of times the current model predicts it will occur in available queries, M(F), by summing P(H) over each historical query H that includes the feature F.
5. Calculate for each feature F the difference between the known number of times the feature appeared in historical queries, H(F), and the predicted number, M(F), and if for each feature the difference is less than a threshold, stop training and use the current weights.
6. Otherwise, update each feature F's weight W(F) using the formula $W(F) \leftarrow W(F)+K*(H(F)-M(F))$ where K is some small constant like 0.01.
7. Go to 3 until all weights have been determined.

The availability predictor 65$c'$ assigns the weights to the positive factors and adds 176 them to produce a total weight number. The total weight is converted 178 to a total probability. One technique to convert the weight sum to a total probability uses an exponential model of the form $e^x/(1+e^x)$, where x is the total weight number. Alternative models include a linear or quadratic discriminator, factorial model, decision tree, decision list, neural network, sigmoidal network, Bayesian network, naive Bayesian network, Markov random field, maximum entropy model, exponential or log linear model, nearest neighbor model, radial basis model or support vector model and so forth. All of these other models assume that there are features, but not necessarily that the features have weights that are summed.

Figure 10B:
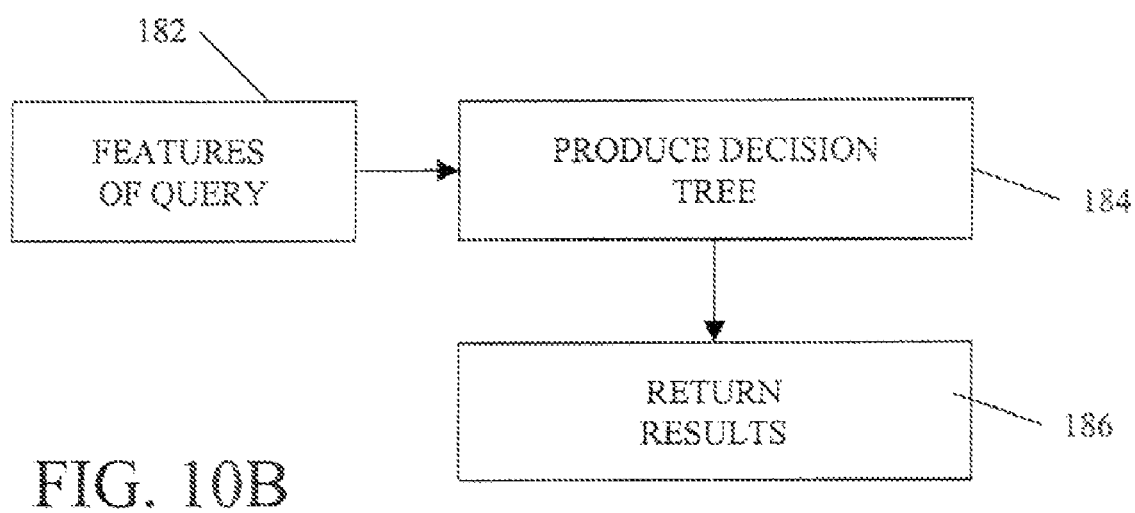
FIG. 10B is a block diagram of an availability predictor using a decision tree algorithm.

Referring now to FIG. 10B, an alternative embodiment 65$c''$ of the model-based availability predictor 65$c$ (FIG. 8) takes 182 features of the query and uses 184 a decision tree to evaluate the query. From the decision tree, a predicted answer to the query is returned 186. A decision tree is another type of classifier, already listed above. As weights are computed ahead of time in the exponential model the "decision tree" is built ahead of time from historical data. The decision tree is used to predict by following branches appropriate for a given query's features and then returning the probability/answer found at the leaf of that the tree the branches lead to. The decision tree is built from historical data.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A system comprises:
one or more computer systems, each of the one or more systems comprising:
 a processor; and
 memory coupled to the processor, the memory storing:
 an availability predictor program that produces a predicted answer of seating availability on an airline flight, the predicted answer being a prediction of an answer that would be provided from an airline revenue management system associated with the airline flight;
 a revenue management program that produces in response to an availability query an actual availability response for a flight; and
 decision logic that compares the predicted answer from the availability predictor and the actual availability response from the revenue management system, to produce a decision that determines whether the actual availability response from the revenue management system should be modified.
2. The system of claim 1 wherein the decision of the decision logic is a bias that determines whether the actual answer should be modified based upon the predicted answer for seating availability of the airline flight that is a competitive flight to the flight represented by the availability predictor.
3. The system of claim 2 further comprising:
 modifying logic that is responsive to the availability response from the availability system and from the bias from the decision logic to modify the actual availability answer in accordance with the bias.
4. The system of claim 1 wherein the decision logic determines whether the prediction answer from the availability predictor indicates that a competitor is in a more favorable or less favorable competitive position than the actual answer produced by the availability system.
5. The system of claim 4 wherein the decision from the decision logic has a plurality of states.
6. The system of claim 1 wherein the decision from the decision logic has a plurality of states.
7. The system of claim 6 wherein one of the states includes a neutral state that does not tend to modify the potential answer received from the availability system.
8. The system of claim 6 wherein one of states biases the answer towards answering that a seat is available.
9. The system of claim 6 wherein one of states biases the answer towards answering that a seat is not available.
10. The system of claim 6 wherein at least one of the states depends upon the relative competitive position of the competitor represented by the availability predictor.
11. The system of claim 1 wherein the decision logic determines whether the competitor's available booking codes are at a lower price than booking codes associated with the availability response for the flight provided to the revenue management program.
12. The system of claim 11 wherein if the competitor's available booking codes are not at a lower price, then the system can return a bias towards making the seat unavailable.
13. The system of claim 12 wherein if the competitor's available booking codes are not at a lower price, then the system can test whether the original query was for a low cost fare and return a bias towards making the seat not available if the query was for a low fare.
14. The system of claim 11 wherein if the competitor's available booking codes are at a lower price than those being offered by the user of the system, the system returns a bias towards making the seat available.
15. The system of claim 11 wherein if the competitor's available booking codes are at a lower price than those being offered by the user of the system, the system determines whether the query was for a high cost fare, and returns a bias towards making the seat available if for a high cost fare.
16. The system of claim 1 wherein the availability predictor is a cache.
17. A method of predicting relative, competitive availability of seating on an airline flight comprises:
 producing, by an availability predictor system which includes one or more computer systems, seating availability on a competitive flight;
 providing by the one or more computer systems an actual availability response for a flight; and comparing by the one or more computer systems the predicted answer from the availability predictor and the potential answer from the availability system to establish a decision with respect to actual availability, with comparing producing a decision that is a bias that determines whether the response should be modified based upon the relative competitive position of the competitor represented by the availability predictor.

18. The method of claim 17 further comprising:
modifying the actual availability response in accordance with the bias.

19. The method of claim 17 further comprising:
determining whether the competitor's available booking codes are at a lower price than those which the availability system indicates the user of the system can offer.

20. A computer program product residing on a computer readable storage medium for determining relative availability of seating on an airline flight comprises instructions for causing a computing device to:
determine a flight that is a competitive flight to a selected flight;
provide a predicted seating availability answer for the competitive flight;
provide an actual availability response for the selected flight;
comparing the predicted seating availability answer and the actual availability response for the selected flight; and
modify the actual availability response for the selected flight according to an outcome of the prediction.

21. The computer program product of claim 20 further comprising instructions to:
produce a bias that determines whether the actual answer should be modified based upon the instructions to compare.

22. The computer program product of claim 21 further comprising instructions to:
modify the actual availability answer in accordance with the bias.

23. The computer program product of claim 20 further comprising instructions to:
determine whether the predicted answer indicates that a competitor is in a more favorable or less favorable competitive position than the actual response.

24. The computer program product of claim 20 further comprising instructions to:
produce a decision that has a plurality of states.

25. The computer program product of claim 20 wherein the states are a neutral state that does not tend to modify the actual response, a state that biases the actual response towards answering that a seat is available, and a state that biases the actual response towards answering that a seat is unavailable.

26. The computer program product of claim 20 further comprising instructions to
determine whether the competitor's available booking codes are at a lower price than those which the availability system indicates the user of the system can offer.

27. The computer program product of claim 26 wherein if the competitor's available booking codes are not at a lower price, then the system can return a bias towards making the seat unavailable.

28. The computer program product of claim 26 wherein if the competitor's available booking codes are not at a lower price, then the system can test whether the original query was for a low cost fare and return a bias towards making the seat not available if the query was for a low fare.

29. The computer program product of claim 26 wherein if the competitor's available booking codes are at a lower price than those being offered by the user of the system, the system returns a bias towards making the seat available.

30. The computer program product of claim 26 wherein if the competitor's available booking codes are at a lower price than those being offered by the user of the system, the system determines whether the query was for a high cost fare, and returns a bias towards making the seat available if for a high cost fare.

* * * * *

UNITED STATES PATENT AND TRADEMARK OFFICE
CERTIFICATE OF CORRECTION

| | | |
|---|---|---|
| PATENT NO. | : 7,881,952 B2 | Page 1 of 1 |
| APPLICATION NO. | : 11/745552 | |
| DATED | : February 1, 2011 | |
| INVENTOR(S) | : Jeremy Wertheimer | |

It is certified that error appears in the above-identified patent and that said Letters Patent is hereby corrected as shown below:

On the title page, item (75) Col. 1, Inventors, delete "Carl G. DeMareken" and insert --Carl G. de Marcken-- therefor.

Signed and Sealed this
Twentieth Day of December, 2011

David J. Kappos
*Director of the United States Patent and Trademark Office*